United States Patent
Storm et al.

(10) Patent No.: US 11,255,467 B2
(45) Date of Patent: Feb. 22, 2022

(54) HOSE RETAINER

(71) Applicant: DEERE & COMPANY, Moline, IL (US)

(72) Inventors: Michael L. Storm, Hazel Green, WI (US); Alex Berning, Hazel Green, WI (US)

(*) Notice: Subject to any disclaimer, the term of this patent is extended or adjusted under 35 U.S.C. 154(b) by 12 days.

(21) Appl. No.: 16/553,440

(22) Filed: Aug. 28, 2019

(65) Prior Publication Data

US 2021/0062938 A1  Mar. 4, 2021

(51) Int. Cl.
*F16L 3/10* (2006.01)
*B60R 16/08* (2006.01)
*F16L 3/08* (2006.01)

(52) U.S. Cl.
CPC ............ *F16L 3/1033* (2013.01); *B60R 16/08* (2013.01); *F16L 3/085* (2013.01)

(58) Field of Classification Search
CPC . F16L 3/1033; F16L 3/085; F16L 3/02; F16L 3/003; F16L 3/00; F16L 3/08; F16L 3/13; F16L 3/22; F16L 3/222; F16L 3/221; F16L 3/223; F16L 3/2235; F16L 3/137; H02G 7/05; H02G 5/053; B60R 16/08
See application file for complete search history.

(56) References Cited

U.S. PATENT DOCUMENTS

| | | | | |
|---|---|---|---|---|
| 4,562,982 A | * | 1/1986 | McSherry | H02G 7/06 248/61 |
| 4,819,897 A | * | 4/1989 | Gooding | E02F 9/2275 137/355.17 |
| 5,730,399 A | * | 3/1998 | Baginski | H02G 3/263 24/16 PB |
| 5,987,709 A | * | 11/1999 | Chou | A01K 27/005 24/115 F |
| 8,079,560 B2 | * | 12/2011 | Blackwell | B62J 99/00 248/229.1 |
| 8,523,858 B2 | * | 9/2013 | Lessig | A61B 17/6458 606/54 |

(Continued)

FOREIGN PATENT DOCUMENTS

CN         204592578 U         8/2015

OTHER PUBLICATIONS

Gibraltar Road Series SC-GRSAR Adj. Right Angle Clamp, retrieved from internet <https://www.steveweissmusic.com/product/1124966/drum-racks?_sm_au_=iVVJP6Zn0MNnn1FM>, 1 page.

*Primary Examiner* — Christopher Garft (57) ABSTRACT

A hose retainer configured to support individual hoses from a plurality of hoses comprises a first apparatus and a second apparatus. The first apparatus may comprise a first conduit for receiving a first hose from the plurality of hoses, and the second apparatus may comprise a second conduit for receiving a second hose from the plurality of hoses. The first conduit may extend in a first plane and the second conduit may extend in a second plane. The first apparatus may further comprise a first plurality of protrusions radially spaced about a first central axis and extend from a first surface. The second apparatus may further comprise a second plurality of protrusion radially spaced apart about a second central axis and extend from a second surface. The first plurality of protrusions and the second plurality of protrusions may interlock.

14 Claims, 7 Drawing Sheets

(56) References Cited

U.S. PATENT DOCUMENTS

| | | | | |
|---|---|---|---|---|
| 2002/0037193 A1* | 3/2002 | Gibbons | ................. | H02G 3/30 |
| | | | | 403/344 |
| 2004/0206855 A1* | 10/2004 | Caveney | ............. | B60R 16/0215 |
| | | | | 248/68.1 |
| 2006/0090807 A1* | 5/2006 | Friedline | ................. | F16L 3/222 |
| | | | | 138/106 |
| 2011/0226913 A1* | 9/2011 | Feige | ........................ | F16L 3/12 |
| | | | | 248/74.2 |
| 2014/0259620 A1 | 9/2014 | Hicks et al. | | |
| 2015/0377070 A1* | 12/2015 | Robertson, Jr. | ........... | F02C 7/32 |
| | | | | 415/182.1 |
| 2018/0356007 A1* | 12/2018 | Waters | ................. | F16L 3/1222 |
| 2020/0099212 A1* | 3/2020 | Bell | ........................ | F16L 3/222 |
| 2020/0109800 A1* | 4/2020 | Bell | ........................ | F16L 3/221 |

* cited by examiner

HOSE RETAINER

CROSS-REFERENCE TO RELATED APPLICATIONS

N/A

FIELD OF THE DISCLOSURE

The present disclosure relates to a hose retainer for supporting individual hoses from a plurality of hoses.

BACKGROUND

All work machines include multiple hoses to transport fluid from a first location to a second location and located within a confined space of the housing panel on the work machine. The hoses often overlap, crisscrossing paths, creating a complex weave of hoses with and between components. Furthermore, the hoses may be subject to strong vibrations while the work machine traverses rough terrain and the engine works hard to support the load on the work machine, thereby possibly creating some movement of the hoses. Current methods to address this issue include a common variety of hose clamps consisting of "block style" hose supports because the finished assembly is a rectangular block shape. However, these hose clamps require that each respective conduit for each respective hose run parallel to one another. Furthermore, the conduits in "block style" hose supports require a precision fit to hold the hose securely.

Therein lies a need to reduce the complexity of hose assembly and improve organization of the plurality of hoses found in a work machine.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a hose retainer for supporting individual hoses from a plurality of hoses.

According to an aspect of the present disclosure, a hose retainer configured to support individual hoses from a plurality of hoses comprises a first apparatus and a second apparatus. The first apparatus may comprise a first conduit for receiving a first hose from the plurality of hoses, and the second apparatus may comprise a second conduit for receiving a second hose from the plurality of hoses. The first conduit may extend in a first plane and the second conduit may extend in a second plane. The first apparatus may further comprise a first plurality of protrusions radially spaced about a first central axis and extend from a first surface. In an alternative embodiment, the first plurality of protrusions may extend from a first outer surface. The second apparatus may further comprise a second plurality of protrusion radially spaced about a second central axis and extend from a second surface. In an alternative embodiment, the second plurality of protrusion may extend from a second outer surface. The first plurality of protrusions and the second plurality of protrusions may interlock. The first central axis and the second central axis may align when the first plurality of protrusion and the second plurality of protrusions interlock. The first plurality of protrusions and the second plurality of protrusions interlock in a plurality of protrusions. One or more of the first conduit and the second conduit may be partially exposed.

The hose retainer of claim 1 may further comprise a first groove on a first outer surface of the first apparatus, and a second groove on a second outer surface of the second apparatus, wherein the first groove and the second groove align when the first plurality of protrusions and the second plurality of protrusions interlock. The first groove and second groove may be configured to engage a loop, the loop capable of constricting.

The first outer surface comprises a plurality of first grooves, and the second outer surface comprises a plurality of second grooves.

The first apparatus may further comprise a first indicia. The first indicia is indicative of a first fluid flowing through a first hose. The second apparatus may comprise a second indicia. The second indicia is indicative of a second fluid flowing through a second hose.

The first conduit may further comprise a first detent for retaining the first hose, and the second conduit may further comprise a second detent for retaining the second hose.

The hose retainer may further a comprise a third apparatus comprising a third conduit for receiving a third hose from the plurality of hoses. The third conduit may extend in a third plane. The third apparatus may further comprise a third plurality of protrusions radially spaced about a third central axis. The third plurality of protrusions may protrude from a third surface. The first apparatus may further comprise a fourth plurality of protrusions protruding from a fourth surface. The third plurality of protrusions and the fourth plurality of protrusions may interlock.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Figure 1:
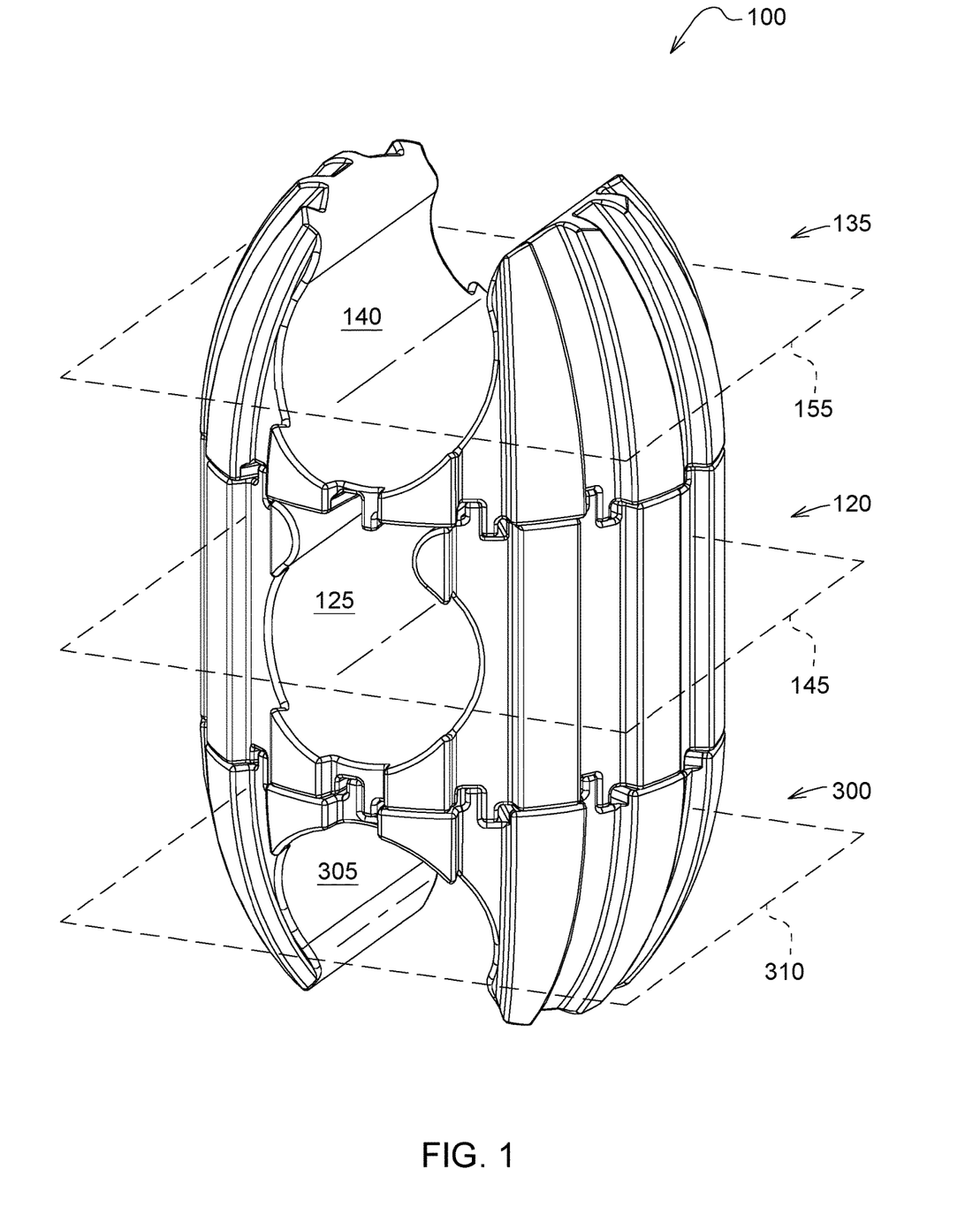
FIG. 1 is a perspective view of a hose retainer according to a first embodiment.
Figure 2:
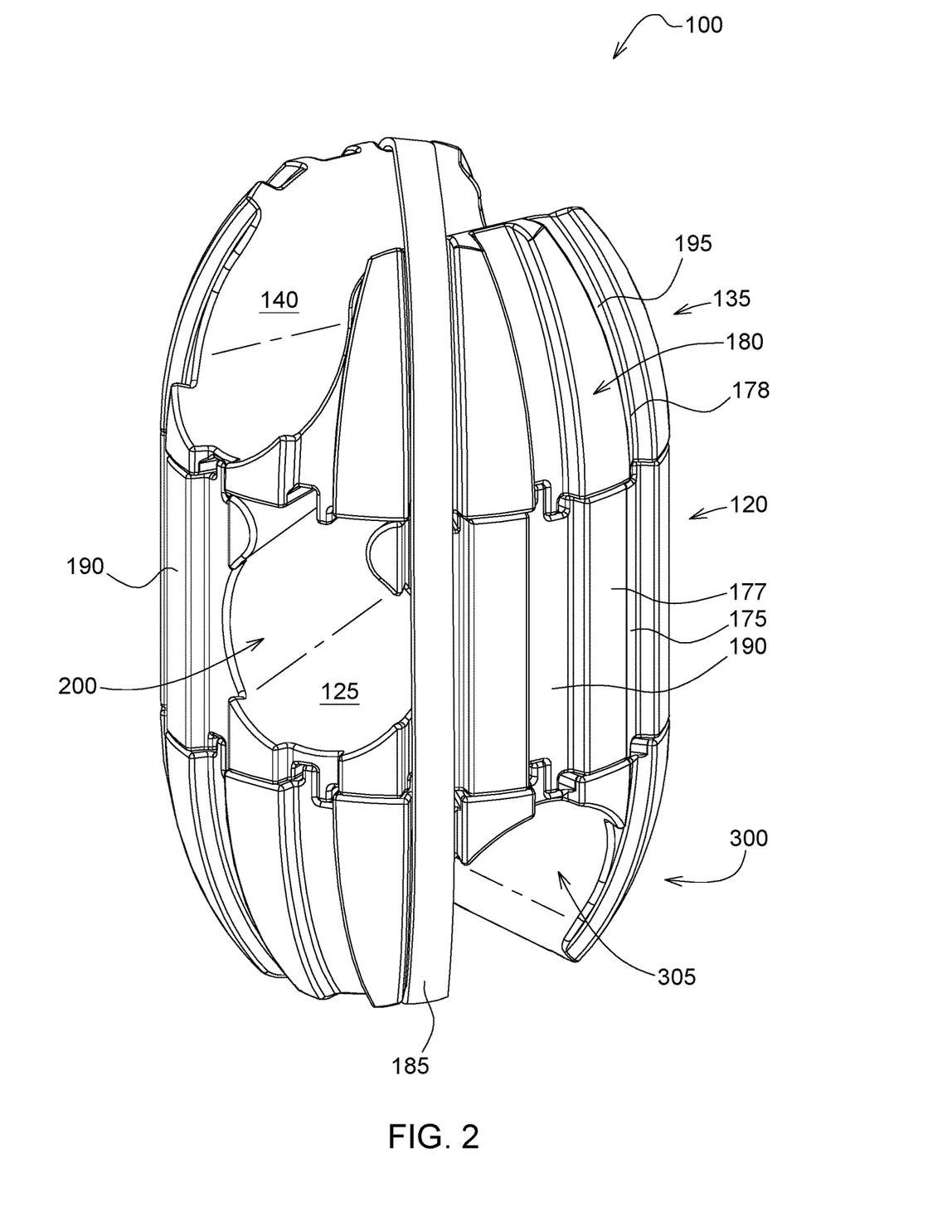
FIG. 2 is a perspective view of a hose retainer according to the embodiment shown in FIG. 1 with a loop wherein the components are oriented in another configuration.
Figure 3:
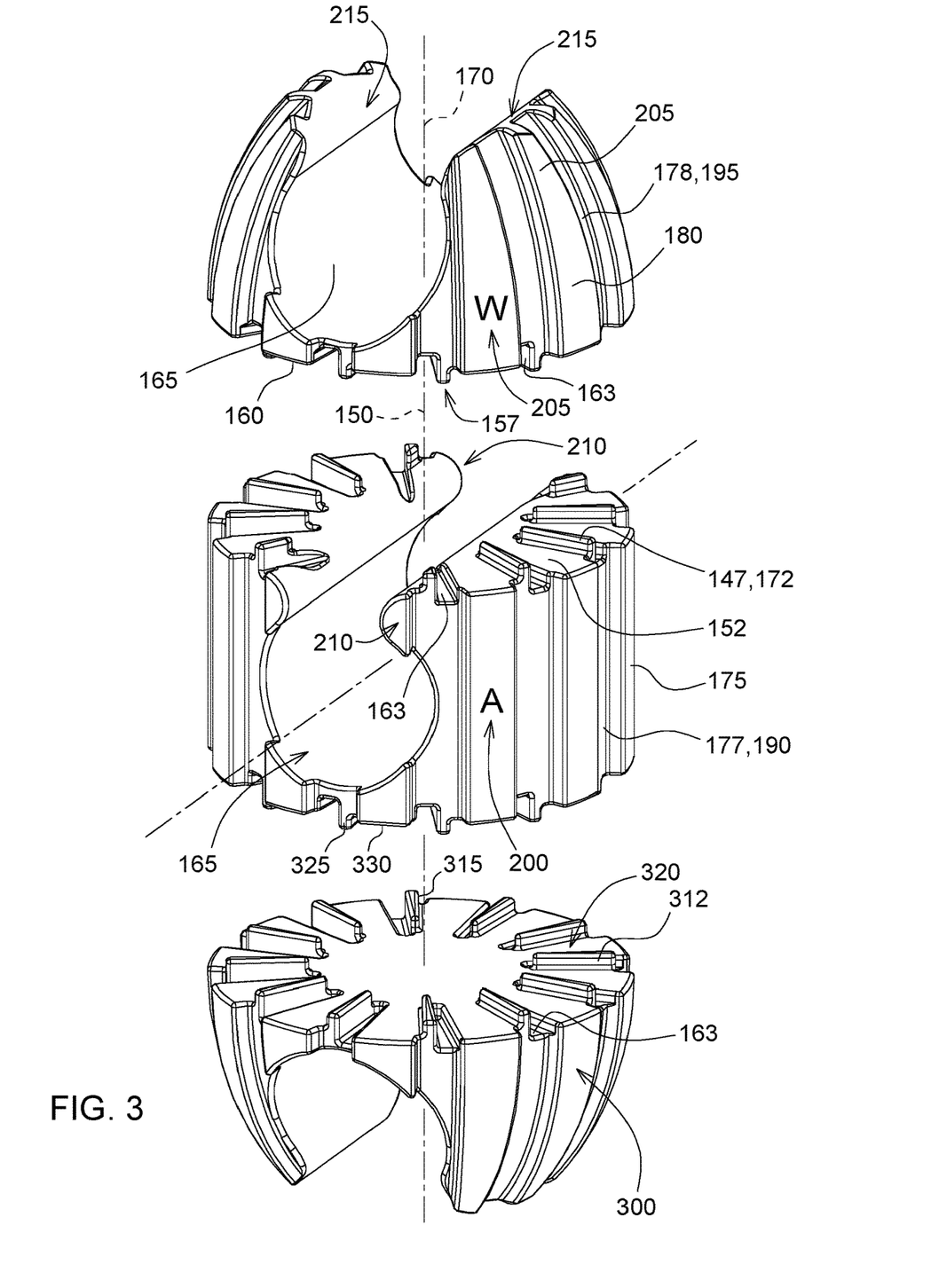
FIG. 3 is an exploded view of the hose retainer according to the embodiment shown in FIG. 1.
Figure 7:
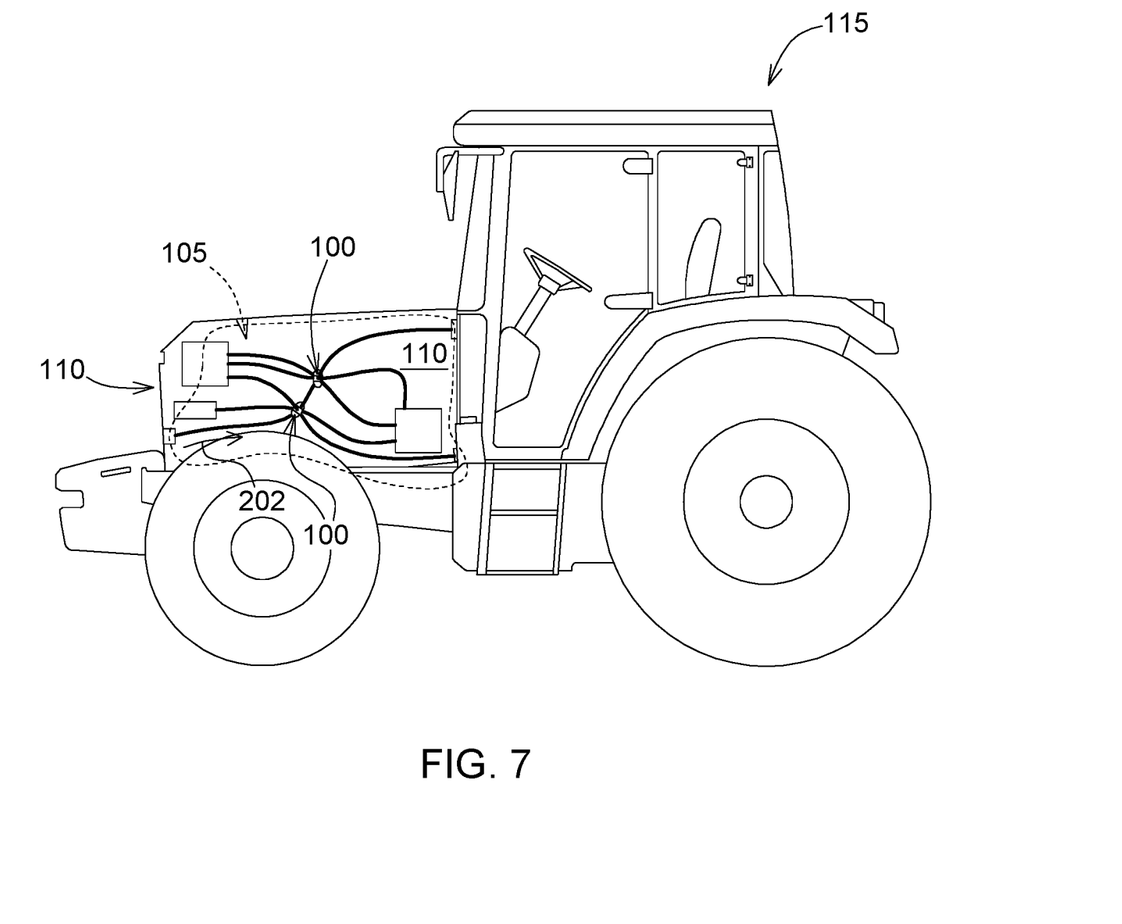
FIG. 7 is a side view of a work machine, the view demonstrating an application of the hose retainer within a housing panel.

FIGS. 1 through 3 illustrate a perspective view of a hose retainer 100 according to a first embodiment. The hose retainer 100 is configured to support individual hoses from a plurality of hoses 105 (shown in FIG. 7). In one application, as shown in FIG. 7, the hose retainer 100 may advantageously optimize, organize, secure, and identify individual hoses from a plurality of hoses 105 found within a housing assembly 110 of a work machine 115. The plurality of hoses 105 generally transports fluids (such as air, hydraulic fluid, water, fuel, coolants, etc.) from a first component to a second component of the work machine 115. The hose retainer 100 comprises a first apparatus 120 comprising a first conduit 125 for receiving a first hose (not shown) from the plurality of hoses 105, and a second apparatus 135 comprising a second conduit 140 for receiving a second hose (not shown) from the plurality of hoses 105. The first conduit 125 may extend in a first plane 145 and further comprise a first plurality of protrusions 147 radially spaced about a first central axis 150. The first plurality of protrusions 147 may protrude from a first surface 152 of the first apparatus 120. The second conduit 140 may extend in a second plane 155 and further comprise a second plurality of protrusions 157 radially spaced about a second central axis 170. The second plurality of protrusions 157 may protrude from a second surface 160. The first plurality of protrusions 147 and the second plurality of protrusions 157 may interlock, thereby coupling the first apparatus 120 with the second apparatus 135 and may further couple the first surface 152 of the first apparatus 120 with the second surface 160 of the second apparatus 135. Interlocking the first apparatus 120 and the second apparatus 135 may be direct as shown in FIG. 1 or comprise a coupling apparatus (not shown) in between. To interlock, the first plurality of protrusions 147 and the second plurality of protrusions 157 are staggered about the first central axis 150 and the second central axis 170, respectively, wherein the peaks of the plurality of protrusions engage with the troughs 163 of the plurality of protrusions. In the exemplary embodiment shown, these troughs 163 from the plurality of protrusions are recessed in the surface (152, 160). In another exemplary embodiment, these troughs 163 may form the surface. The first conduit 125 and second conduit 140 may be elliptical or circular in cross-sectional shape, or any other shape to accommodate a hose. Also note that the first plane 145 and the second plane 155 may be substantially parallel as shown in the first embodiment, although not required. Substantially parallel may be less than 30 degrees, or preferably less than 15 degrees, or as shown zero degrees. Having the first conduit 125 and the second conduit 140 to be substantially parallel advantageously keeps the hoses from becoming entangled, secures them into relative positions, and enables the hoses to be easily identifiable. Furthermore, one or more of the first conduit 125 and the second conduit 140 may be partially exposed such that the conduit forms a U-shape bottom 165 for the supporting a hose. The partial exposure or opening enables ease of inserting a hose into position prior to coupling the first apparatus 120 and the second apparatus 135. Furthermore, the partial exposure may enable accommodating hoses of different diameters as the cross-section of the conduit tapers. In an alternative embodiment, the conduit may comprise of a through-hole through its respective apparatus.

The first central axis 150 and the second central axis 170 may align when the first plurality of protrusions 147 and the second plurality of protrusions 157 interlock. Because the first plurality of protrusions 147 and the second plurality of protrusions 157 are radially spaced about their respective central axes (150, 170), wherein each protrusion 172 may be equidistant from a next protrusion about their respective central axis, positioning of the first conduit 125 relative to the second conduit 140 may be adjusted to reflect the desired relative orientations of the first conduit 125 and the second conduit 140.

The first plurality of protrusions 147 and the second plurality of protrusions 157 may interlock in a plurality of positions. FIG. 1 shows a first orientation of a first embodiment, and FIG. 2 shows a second orientation of the first embodiment, the first apparatus 120 may be rotated in any position a full 360 degrees about the first central axis 150. The ability to assemble the first apparatus 120 relative to the second apparatus 135 in a multitude of orientations about the central axes (150, 170) advantageously allows accommodating various routings and orientations of hoses crossing one another's path in an organized manner. The first plurality of protrusions 147 and the second plurality of protrusions 157 may further provide a securing mechanism wherein the first plurality of protrusions 147 and the second plurality of protrusions 157 lock, or interlock, thereby securing the first apparatus 120 and the second apparatus 135 together. As additional support or an alternative locking mechanism, the hose retainer 100 may further comprise a first groove 175 on a first outer surface 177 of the first apparatus 120, and a second groove 178 on a second outer surface 180 of the second apparatus 135, wherein the first groove 175 and the second groove 178 align when the first plurality of protrusions 147 and the second plurality of protrusions 157 interlock. The first groove 175 and the second groove 178 may be configured to engage a loop 185 (shown in FIG. 2). In the embodiment shown, the first groove 175 and the second groove 178 comprises a recess extending along a portion of the first outer surface 177 of the first apparatus 120 and the second outer surface 180 of the second apparatus 135, in a direction enabling the recess to traverse both the first apparatus 120 and the second apparatus 135 if continued to extend beyond their respective apparatus when interlocked, thereby forming a continuous path for engaging a loop 185. In the embodiment shown, the grooves (175, 178) follow the general curvature of the outer surface (177, 180) of the apparatus, in a direction substantially aligned with the central axis (150, 170). The recess may be sufficiently deep enough to engage a loop 185 capable of constricting into position to secure the first apparatus 120 with the second apparatus 135. The loop 185 may comprise of a band which may be adjusted for tightness such as a Zip-tie. Alternatively, the loop 185 may comprise of an elastic band, metal wire tightened into place, or any other alternative form enabling a user to position and/or wrap, and secure the loop 185 into place, looping around the first apparatus 120 and the second apparatus 135. The first groove 175 and the second groove 178 may be the sole securing mechanism for coupling the first apparatus 120 and the second apparatus 135 as shown in FIG. 2. Alternatively, it may be a secondary securing mechanism. The loop 185 may further secure a hose into a conduit by wrapping over the conduit once a hose (not shown) is placed into position. Securing a hose may mean restricting disengagement of a hose from a conduit.

The first outer surface 177 may further comprise a plurality of first grooves 190. The second outer surface 180 may further comprise a plurality of second grooves 195. Similar to the plurality of protrusions 147, the first groove 175 and the second groove 178 may be one of a plurality of first grooves 190 and a plurality of second grooves 195 that align for engagement with a loop 185 depending on the orientation of the first apparatus 120 relative to the second apparatus 135.

Additionally, the first apparatus 120 may comprise a first indicia 200 (shown in FIG. 3) wherein the first indicia 200 is indicative of a first fluid (not shown) flowing through a first hose. The second apparatus 135 comprises a second indicia 205 wherein the second indicia 205 is indicative of a second fluid (not shown) flowing through a second hose. The first indicia 200 and the second indicia 205 may comprise one of more of a color, a mark, a labeling, a symbol, and a texture to indicate one or more of a type of fluid and a direction of fluid.

With continued reference to FIG. 3, the first conduit 125 of the first apparatus 120 may further comprise a first detent 210 for retaining a first hose, and the second conduit may comprise a second detent 215 for retaining the second hose. A detent (210, 215) may comprise of one or more projections extending over a portion of a conduit (125, 140) to secure a respective hose into a conduit. The detent (210, 215) may be mildly flexible to accommodate insertion of a hose into a conduit, or may be rigid to accommodate a press fit. In an alternative embodiment, a rigid yet impact absorptive material may be used wherein only a loop 185 is the securing mechanism to secure a hose within a conduit (125, 140).

Figure 5A:
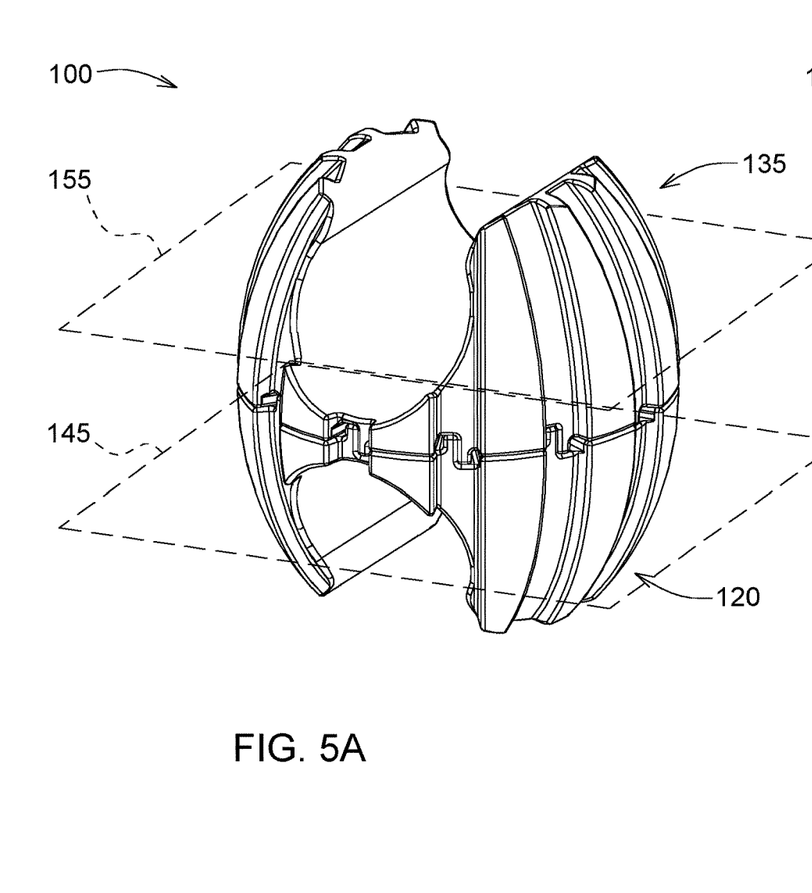
FIG. 5A is a perspective view of the hose retainer according to a third embodiment.
Figure 5B:
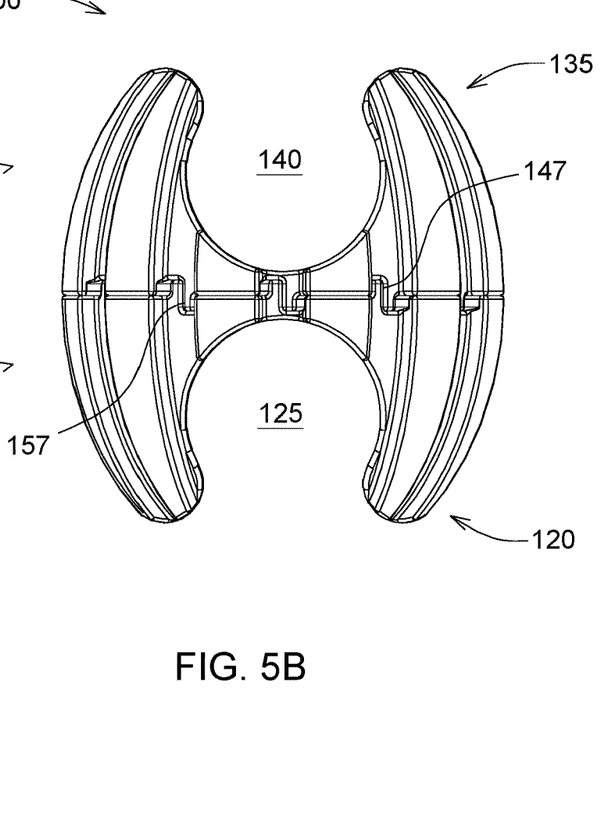
FIG. 5B is a front view of the hose retainer according to a fourth embodiment.

The hose retainer 100 may further comprise a third apparatus 300 comprising a third conduit 305 for receiving a third hose from the plurality hoses 105. The third conduit 305 may extend in a third plane 310. The third apparatus 300 may further comprise a third plurality of protrusions 312 radially spaced about a third central axis 315 wherein the third plurality of protrusions 312 protrude from a third surface 320. The first apparatus 120 may further comprise a fourth plurality of protrusions 325 protruding from a fourth surface 330, wherein the third plurality of protrusions 312 and the fourth plurality of protrusions 325 interlock. The interlocking may function similar to the aforementioned interlocking mechanism of the first plurality of protrusions 147 and the second plurality of protrusions 157. As demonstrated in FIGS. 5 and 6 and discussed in further detail below, insertion of additional first apparatuses 120 or deletion of an apparatus creates a modular and adjustable hose retainer 100 for accommodating any number of hoses with any number of orientations, crossing at a particular location.

Each apparatus (120, 135, 300) may be a singular piece and preferably made of a polymer, a rubber, or any other material having the ability to resist a permanent distortion or deformation when subject to a force or vibration. Furthermore, the material should have the ability for impact absorption. The apparatus (120, 135, 300) may be easily manufactured through injection-molding, casting, machining, or other standard manufacturing processes.

Figure 4:
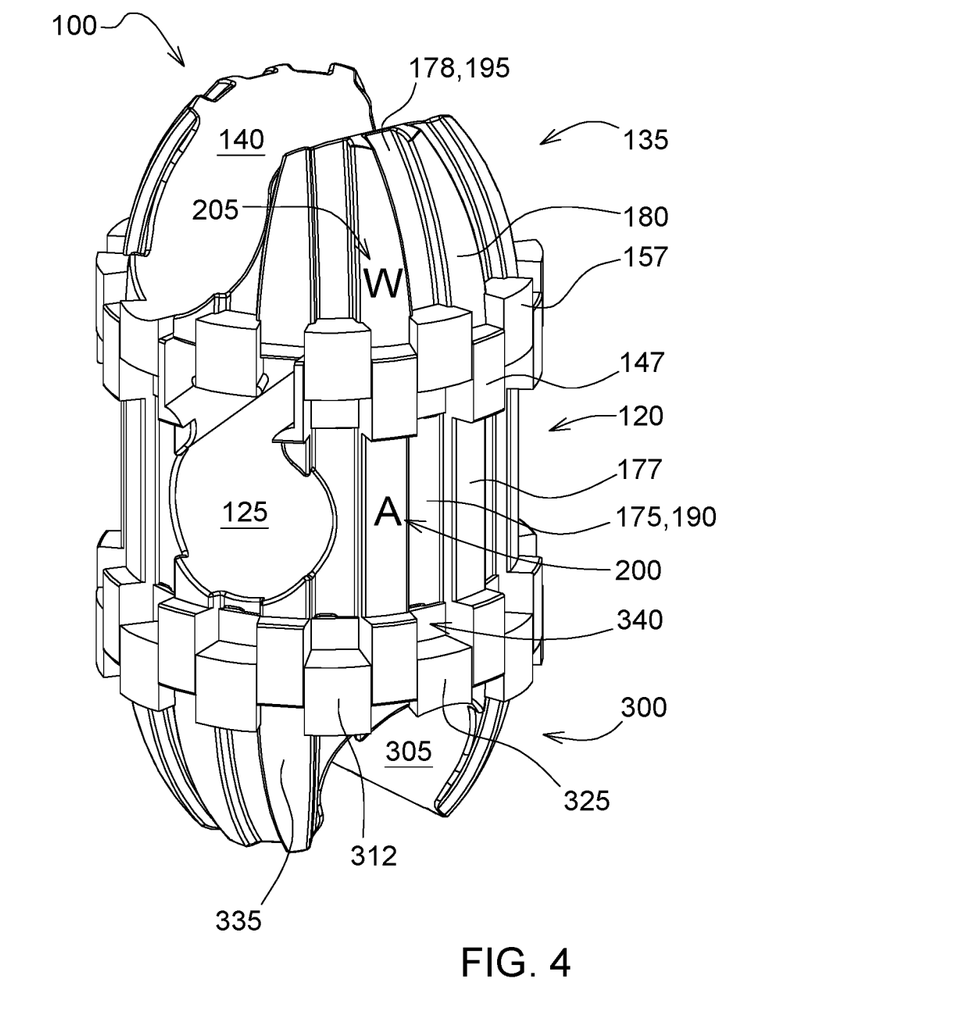
FIG. 4 is a perspective view of the hose retainer according to a second embodiment.

Now turning to FIG. 4, a second embodiment of the hose retainer 100 is shown. In this second embodiment, the hose retainer 100 may comprise of a first apparatus 120 comprising a first conduit 125 for receiving a first hose from a plurality of hoses 105, and a second apparatus 135 comprising a second conduit 140 for receiving a second hose from the plurality of hoses 105. Similar to the embodiment shown in FIGS. 1-3, the first apparatus 120 may comprise a first plurality of protrusions 147 extending from at least a portion of the first outer surface 177 and the second apparatus 300 comprising a second plurality of protrusions 157 extending from at least a portion of the second outer surface 180, wherein the first plurality of protrusions 147 and the second plurality of protrusions 157 interlock.

The hose retainer may further comprise a first groove 175 on a first outer surface 177 of the first apparatus 120, and a second groove 178 on a second outer surface 180 of the second apparatus 135, wherein the first groove 175 and the second groove 178 align when the first plurality of protrusions 147 and the second plurality of protrusions 157 interlock. The first groove 175 and the second groove 178 are configured to engage a loop 185 (shown in FIG. 2). The loop 185 secures the first apparatus 120 with the second apparatus 135. The first outer surface 177 comprises a plurality of first grooves 190 and the second outer surface 195 comprises plurality of second grooves 195.

Again, the first plurality of protrusions 147 and the second plurality of protrusions 157 may interlock in a plurality of positions. The first apparatus 120 may comprise of a first indicia 200 indicative of a first fluid flowing through the first hose. The second apparatus 135 may comprise of a second indicia 205 indicative of a second fluid flowing through the second hose. Furthermore, the first conduit 125 may comprise a first detent 210 (as shown in FIG. 3) for retaining the first hose, and the second conduit 140 may comprise of a second detent 215 (as shown in FIG. 3) for retaining the second hose to improve retention for each respective hose. The hose retainer 100 may further comprise a third apparatus 300 comprising a third conduit 305 for receiving a third hose from the plurality of hoses. The third apparatus 300 may comprise a third plurality of protrusions 312 extending from at least a portion of a third outer surface 335. The first apparatus 120 may further comprise a fourth plurality of protrusions 325 extending from at least a portion of a fourth outer surface 340, wherein the third plurality of protrusions 312 and the fourth plurality of protrusions 325 interlock.

Figure 6:
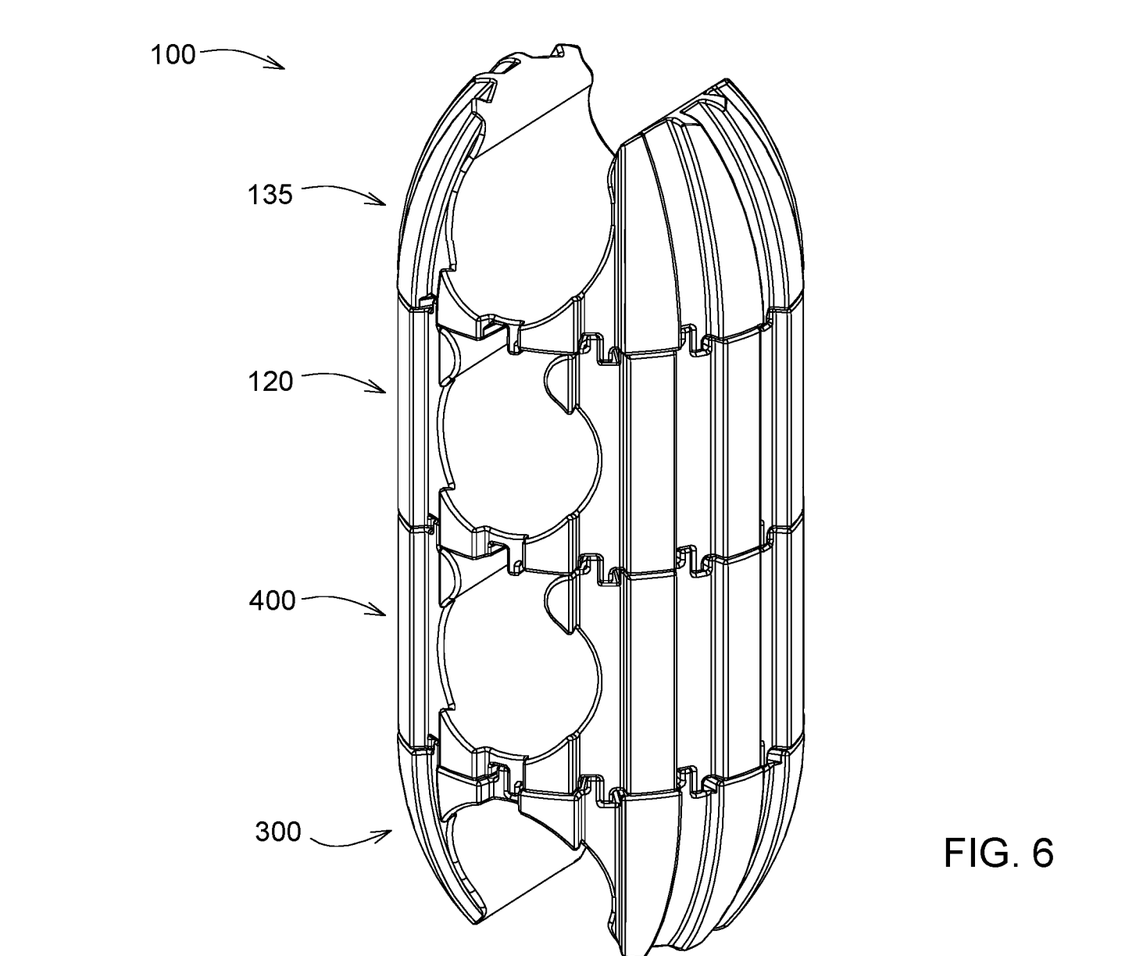
FIG. 6 is a perspective view of the hose retainer according to a fourth embodiment.

Now turning to FIGS. 5A-5B and 6 wherein the modularity of the hose retainer 100 is demonstrated. FIGS. 5A and 5B demonstrate a third embodiment wherein the hose retainer 100 comprises a first apparatus 120 comprising a first conduit 125 for receiving a first hose (not shown) from the plurality of hoses 105, and a second apparatus 135 comprising a second conduit 140 for receiving a second hose (not shown) from the plurality of hoses 105. Having the same interlocking mechanism from the first embodiment in FIGS. 1-3 or alternatively the second embodiment in FIG. 4 (not shown), the first conduit 125 may extend in a first plane 145 and further comprise a first plurality of protrusions 147 radially spaced about a first central axis 150. The second conduit 140 may extend in a second plane 155 and further comprise a second plurality of protrusions 157 radially spaced about a second central axis 170. The second plurality of protrusions 157 may protrude from a second surface 160. The first plurality of protrusions 147 and the second plurality of protrusions 157 may interlock, thereby coupling the first apparatus 120 with the second apparatus 135 and may further couple the first surface 152 of the first apparatus 120 with the second surface 160 of the second apparatus 135. The third embodiment shown comprises only a first apparatus 120 and a second apparatus 135, representing the minimum apparatuses required for the hose retainer 100.

FIG. 6 demonstrate a fourth embodiment wherein the hose retainer 100 comprises the components of the first embodiment shown in FIGS. 1-3 along with a fourth apparatus 400, thereby enabling the hose retainer 100 to accommodate a minimum of four hoses.

While the above describes example embodiments of the present disclosure, these descriptions should not be viewed in a restrictive or limiting sense. Rather, there are several variations and modifications which may be made without departing from the scope of the appended claims.

What is claimed is:

1. A hose retainer configured to support individual hoses from a plurality of hoses, the hose retainer comprising:
   a first apparatus comprising
      a first conduit for receiving a first hose from the plurality of hoses, the first conduit extending in a first plane;
      a first groove on a first outer surface of the first apparatus;
      a first plurality of protrusions radially spaced about a first central axis, the first plurality of protrusions protruding from a first surface; and
   a second apparatus comprising
      a second conduit for receiving a second hose from the plurality of hoses, the second conduit extending in a second plane;
      a second groove on a second outer surface of the second apparatus;
      a second plurality of protrusions radially spaced about a second central axis, the second plurality of protrusions protruding from a second surface;
   wherein the first plurality of protrusions and the second plurality of protrusions interlock and the first groove and the second groove are independently movable with respect to each other and align when the first plurality of protrusions and the second plurality of protrusions interlock, and wherein interlocking of the first plurality of protrusions and the second plurality of protrusions form a unitary body of the first apparatus and the second apparatus, the first apparatus and the second apparatus immovably secured together.

2. The hose retainer of claim 1, wherein the first central axis and the second central axis align when the first plurality of protrusions and the second plurality of protrusions interlock.

3. The hose retainer of claim 1, wherein the first groove and the second groove are configured to engage a loop, the loop capable of constricting.

4. The hose retainer of claim 1, wherein the first outer surface comprises a plurality of first grooves, and the second outer surface comprises a plurality of second grooves.

5. The hose retainer of claim 1, wherein the first plurality of protrusions and the second plurality of protrusions interlock in a plurality of positions.

6. The hose retainer of claim 1, wherein the first apparatus further comprises a first indicia, the first indicia indicative of a first fluid flowing through the first hose; and the second apparatus comprises a second indicia, the second indicia indicative of a second fluid flowing through the second hose.

7. The hose retainer of claim 1, wherein the first conduit comprises a first detent for retaining the first hose; and the second conduit comprises a second detent for retaining the second hose.

8. The hose retainer of claim 1, wherein one or more of the first conduit and the second conduit is partially exposed.

9. A hose retainer configured to support individual hoses from a plurality of hoses, the hose retainer comprising:
   a first apparatus comprising
      a first conduit for receiving a first hose from the plurality of hoses, the first conduit partially exposed on a first outer surface, the first outer surface having a first plurality of protrusions extending from at least a portion of the first outer surface;
      a first groove on a first outer surface of the first apparatus;
   a second apparatus comprising
      a second conduit for receiving a second hose from the plurality of hoses, the second apparatus comprising a second plurality of protrusions extending from at least a portion of the second outer surface;
      a second groove on a second outer surface of the second apparatus;
   the first plurality of protrusions and the second plurality of protrusions interlock and the first groove and the second groove are independently movable and align when the first plurality of protrusions and the second plurality of protrusions interlock, and wherein the interlocking of the first plurality of protrusions and the second plurality of protrusions form a unitary body of the first apparatus and the second apparatus, the first apparatus and the second apparatus immovably secured together; and
   a third apparatus comprising a third conduit for receiving a third hose from the plurality of hoses, the third apparatus comprising a third plurality of protrusions extending from at least a portion of a third surface; and
   the first apparatus further comprising a fourth plurality of protrusions extending from at least a portion of a fourth surface;
   wherein the third plurality of protrusions and the fourth plurality of protrusions interlock.

10. The hose retainer of claim 9, wherein the first groove and the second groove are configured to engage a loop, the loop securing the first apparatus with the second apparatus.

11. The hose retainer of claim 9, wherein the first outer surface and comprises a plurality of first grooves and the second outer surface comprises a plurality of second grooves.

12. The hose retainer of claim 9, wherein the first plurality of protrusions and the second plurality of protrusions interlock in a plurality of positions.

13. The hose retainer of claim 9, wherein the first apparatus comprises a first indicia, the first indicia indicative of a first fluid flowing through the first hose; and the second apparatus comprises a second indicia, the second indicia indicative of a second fluid flowing through the second hose.

14. The hose retainer of claim 9, wherein the first conduit comprises a detent for retaining the first hose; and the second conduit comprises a second detent for retaining the second hose.

* * * * *